(12) United States Patent
DeYoung et al.

(10) Patent No.: US 11,181,876 B2
(45) Date of Patent: *Nov. 23, 2021

(54) IDENTIFICATION OF INDUSTRIAL EQUIPMENT USING MICRO-LOCATION SERVICES

(71) Applicant: Rockwell Automation Technologies, Inc., Mayfield Heights, OH (US)

(72) Inventors: Daniel S. DeYoung, Hudson, OH (US); Matthew R. Ericsson, Lyndhurst, OH (US); Douglas Reichard, Fairview Park, OH (US); Michael Ohlsen, Chesterland, OH (US); Kenneth S. Plache, Scottsdale, AZ (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/778,144

(22) Filed: Jan. 31, 2020

(65) Prior Publication Data
US 2020/0166904 A1    May 28, 2020

Related U.S. Application Data

(63) Continuation of application No. 15/620,070, filed on Jun. 12, 2017, now Pat. No. 10,551,809, which is a
(Continued)

(51) Int. Cl.
*G05B 19/042* (2006.01)
*G06Q 10/08* (2012.01)
(Continued)

(52) U.S. Cl.
CPC ......... *G05B 19/042* (2013.01); *G05B 19/418* (2013.01); *G06Q 10/06* (2013.01);
(Continued)

(58) Field of Classification Search
CPC .......... G06K 7/10366; G06K 7/10376; G06K 7/10386; G06K 7/10396
See application file for complete search history.

(56) References Cited

U.S. PATENT DOCUMENTS 10,551,809 B2 *    2/2020   DeYoung ............... G06Q 10/06
2005/0211777 A1    9/2005   Wetzel et al.
(Continued)

FOREIGN PATENT DOCUMENTS

EP    29278514 A1    7/2015

OTHER PUBLICATIONS

Anonymous, "Near field communication—Wikipedia, the free encyclopedia", Oct. 29, 2013, XP055568636, Retrieved from the Internet: URL:https://web.archive.org/web/20130129063046/https://en.wikipedia.org/wiki/Near-field_communication, retrieved on Mar. 13, 2019.
(Continued)

*Primary Examiner* — Daniell L Negron (57) ABSTRACT

Techniques to facilitate identification of industrial equipment using micro-location services in an industrial automation environment are disclosed herein. In at least one implementation, an identification signal is detected transmitted from a wireless transceiver associated with an asset of the industrial automation environment. The identification signal is processed to determine an identity of the asset. A level of proximity of the portable computing system to the wireless transceiver is detected. Information associated with the asset is retrieved based on the identity of the asset. The information associated with the asset is displayed on a display system of a computing system based on the level of proximity.

20 Claims, 7 Drawing Sheets

Related U.S. Application Data continuation-in-part of application No. 14/878,659, filed on Oct. 8, 2015, now abandoned.

(51) Int. Cl.
    *G05B 19/418*     (2006.01)
    *G06Q 10/06*     (2012.01)

(52) U.S. Cl.
    CPC ... *G06Q 10/08* (2013.01); *G05B 2219/21053* (2013.01); *Y02P 90/02* (2015.11)

(56) References Cited

U.S. PATENT DOCUMENTS

| | | |
|---|---|---|
| 2006/0091207 A1 | 5/2006 | Chang |
| 2013/0024542 A1 | 1/2013 | Keller et al. |
| 2013/0060351 A1 | 3/2013 | Imming et al. |
| 2015/0046125 A1 | 2/2015 | Jagiella et al. |
| 2015/0178530 A1 | 6/2015 | Tobita et al. |
| 2015/0312696 A1 | 10/2015 | Ribbich et al. |
| 2017/0082993 A1 | 3/2017 | Narain et al. |

OTHER PUBLICATIONS

Tim Hatton, SWT A Developer's Notebook, In: SWT A Developer's Notebook, Oct. 31, 2004, pp. 106-106, O'Reilly Media, Inc., Sebastopol, California, United States.

* cited by examiner

IDENTIFICATION OF INDUSTRIAL EQUIPMENT USING MICRO-LOCATION SERVICES

This application is a continuation of and claims priority to U.S. patent application Ser. No. 15/620,070, entitled "Identification of Industrial Equipment Using Micro-Location Services", filed Jun. 12, 2017 and issuing as U.S. Pat. No. 10,551,809 on Feb. 4, 2020. This application is also a continuation-in-part of and claims priority to U.S. patent application Ser. No. 14/878,659, entitled "Identification of Industrial Equipment Using Micro-Location Services", filed Oct. 8, 2015, the contents of which are hereby incorporated by reference in their entirety for all purposes.

TECHNICAL FIELD

Aspects of the disclosure are related to computing hardware and software technology.

TECHNICAL BACKGROUND

Software applications that run on computing systems commonly provide some type of user client interface to present information to the user and receive user inputs. In a typical client-server architecture, an application running on a client computing system receives data transmitted from a server over a communication network for display to the user on the user client interface.

Industrial automation environments utilize machines during the industrial manufacturing process. These machines typically have various moving parts and other components that continually produce operational data over time, such as pressure, temperature, speed, and other metrics. Reviewing and monitoring this operational data is of high importance to those involved in operating an industrial enterprise.

In traditional implementations, the operational data may be provided for display on a variety of systems and devices, such as notebook or tablet computers running standalone applications, web browsers, and the like, in order to present the information to the user. For example, a tablet computer could receive a constant stream of the operational data over a network and display this information dynamically, such as by providing live tiles, icons, charts, trends, and other graphical representations which continually receive updated operational data from external data sources, which are typically located in the industrial automation environment.

Overview

Techniques to facilitate identification of industrial equipment using micro-location services in an industrial automation environment are disclosed herein. In at least one implementation, one or more non-transitory computer-readable storage media having program instructions stored thereon, wherein the program instructions, when executed by a portable computing system, direct the portable computing system to at least detect an identification signal continuously transmitted from a wireless transceiver associated with an asset of the industrial automation environment when the portable computing system is in proximity to the asset. The program instructions further direct the portable computing system to process the identification signal to determine an identity of the asset, detect a level of proximity of the portable computing system to the wireless transceiver, and retrieve information associated with the asset based on the identity of the asset. The program instructions further direct the portable computing system to display, based on the level of proximity, at least a portion of the information associated with the asset on a display system of the portable computing system.

In another implementation, a method of operating a portable computing system comprises detecting an identification signal continuously transmitted from a wireless transceiver associated with an asset of the industrial automation environment when the portable computing system is in proximity to the asset, processing the identification signal to determine an identity of the asset; and detecting a level of proximity of the portable computing system to the wireless transceiver. The method further comprises retrieving information associated with the asset based on the identity of the asset and displaying, based on the level of proximity, at least a portion of the information associated with the asset on a display system of the portable computing system.

In yet another implementation, an apparatus to facilitate identification of industrial equipment in an industrial automation environment, the apparatus comprises one or more computer-readable storage media and program instructions stored on the one or more computer-readable storage media that, when executed by a processing system, direct the processing system to detect an identification signal continuously transmitted from a wireless transceiver associated with an asset of the industrial automation environment when the portable computing system is in proximity to the asset. The program instructions further direct the portable computing system to process the identification signal to determine an identity of the asset, detect a level of proximity of the portable computing system to the wireless transceiver, and retrieve information associated with the asset based on the identity of the asset. Based on the level of proximity, the program instructions further direct the portable computing system to display at least a portion of the information associated with the asset on a display system of the portable computing system and allow control access of the asset if the level of proximity is within a command proximity distance threshold.

This Overview is provided to introduce a selection of concepts in a simplified form that are further described below in the Detailed Description. It should be understood that this Overview is not intended to identify key features or essential features of the claimed subject matter, nor is it intended to be used to limit the scope of the claimed subject matter.

BRIEF DESCRIPTION OF THE DRAWINGS

Many aspects of the disclosure can be better understood with reference to the following drawings. While several implementations are described in connection with these drawings, the disclosure is not limited to the implementations disclosed herein. On the contrary, the intent is to cover all alternatives, modifications, and equivalents.

DETAILED DESCRIPTION

The following description and associated figures teach the best mode of the invention. For the purpose of teaching inventive principles, some conventional aspects of the best mode may be simplified or omitted. The following claims specify the scope of the invention. Note that some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

In an industrial automation environment, investigation is primarily dependent on available plant-wide information, which is typically accessible over a network of machines and other equipment. For example, technicians and other users commonly review tag data, trends, alarms, documentation, incident reports, chat transcripts, screen captures, and other content that is generated during the course of operating an industrial enterprise. However, this information is often not readily accessible when interacting with a machine, control system, or some other asset of the industrial operation. Thus, maintaining inventory, identifying equipment, and tracking assets in an industrial manufacturing environment can be difficult with existing solutions. Even once a piece of equipment has been identified, it may be challenging to correlate the equipment to the related software, logical and physical topology, status information, security access, documentation, and other content associated with the equipment. The techniques disclosed herein attempt to facilitate identification of industrial equipment by including micro-location devices with individual pieces of equipment and processing the identification signal transmitted by the micro-location devices to correlate the identifiers to their related assets.

In at least one implementation, a user operates a computing system such as a smartphone, tablet, or laptop to detect an identification signal transmitted by a micro-location device attached to an asset of the industrial automation environment, such as a beacon transmission, radio frequency identification (RFID), or any other wireless identification technique. The identification signal indicates an identifier of the asset that can be used to retrieve information associated with the asset for display to the user. The information provides context into industrial services and software related to the equipment and can further enable location-based workflows according to the user's proximity to a particular device. In this manner, the user is able to view production processes, manage alarms, access dashboards, monitor control information and logic, send control instructions to equipment, and other relevant functionality.

Figure 1:
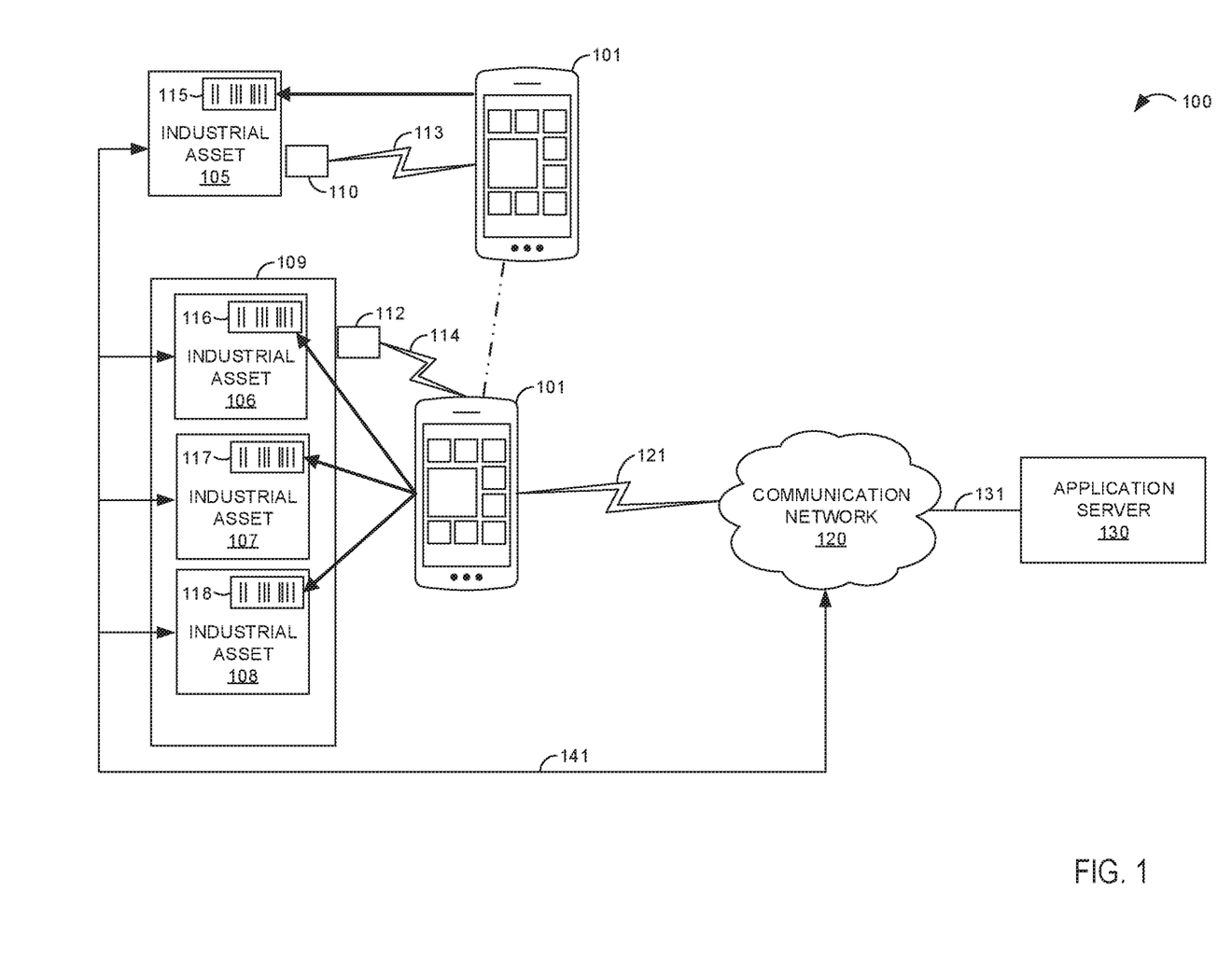
FIG. 1 is a block diagram that illustrates an operation of a communication system in an exemplary implementation.
Figure 2:
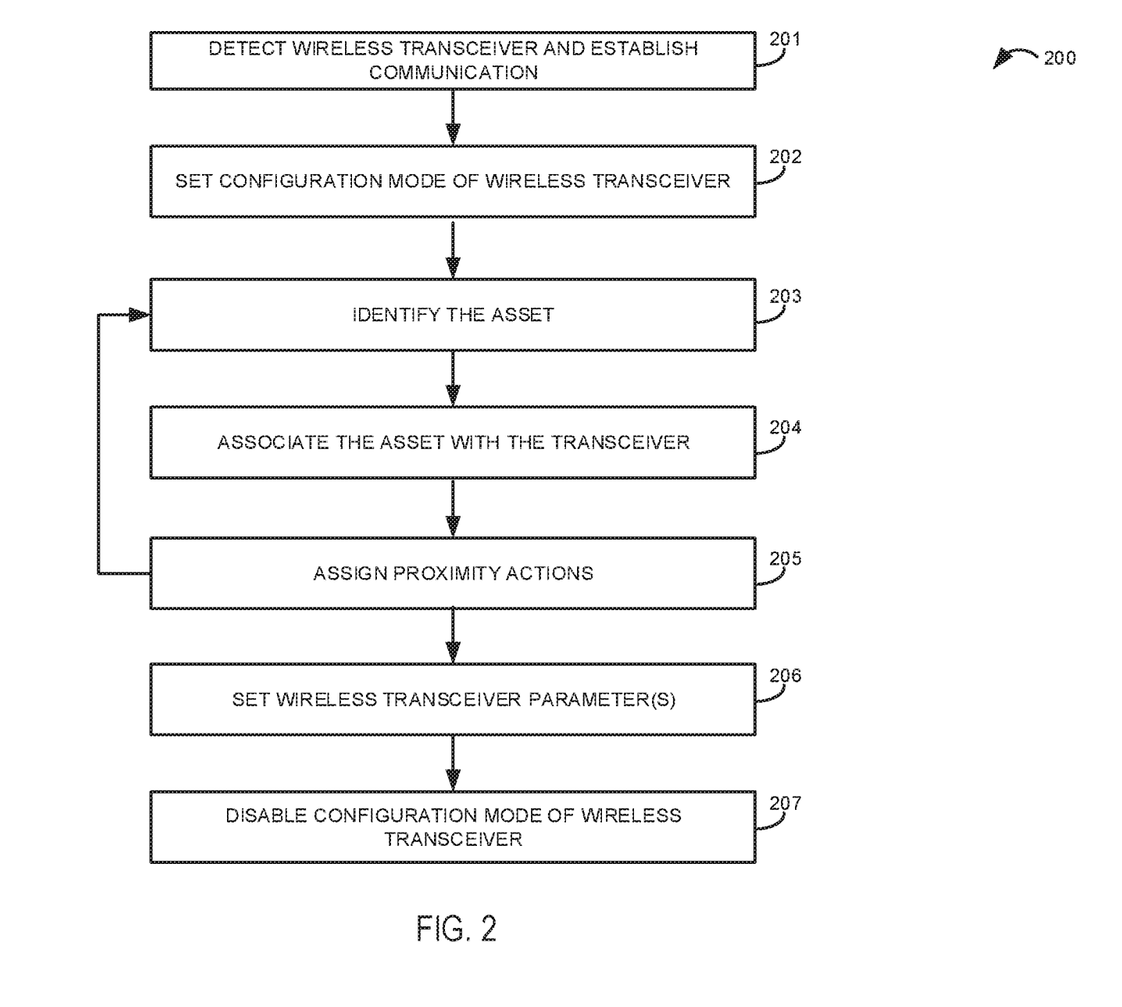
FIG. 2 is a flow diagram that illustrates an operation of a computing system in an exemplary implementation.
Figure 3:
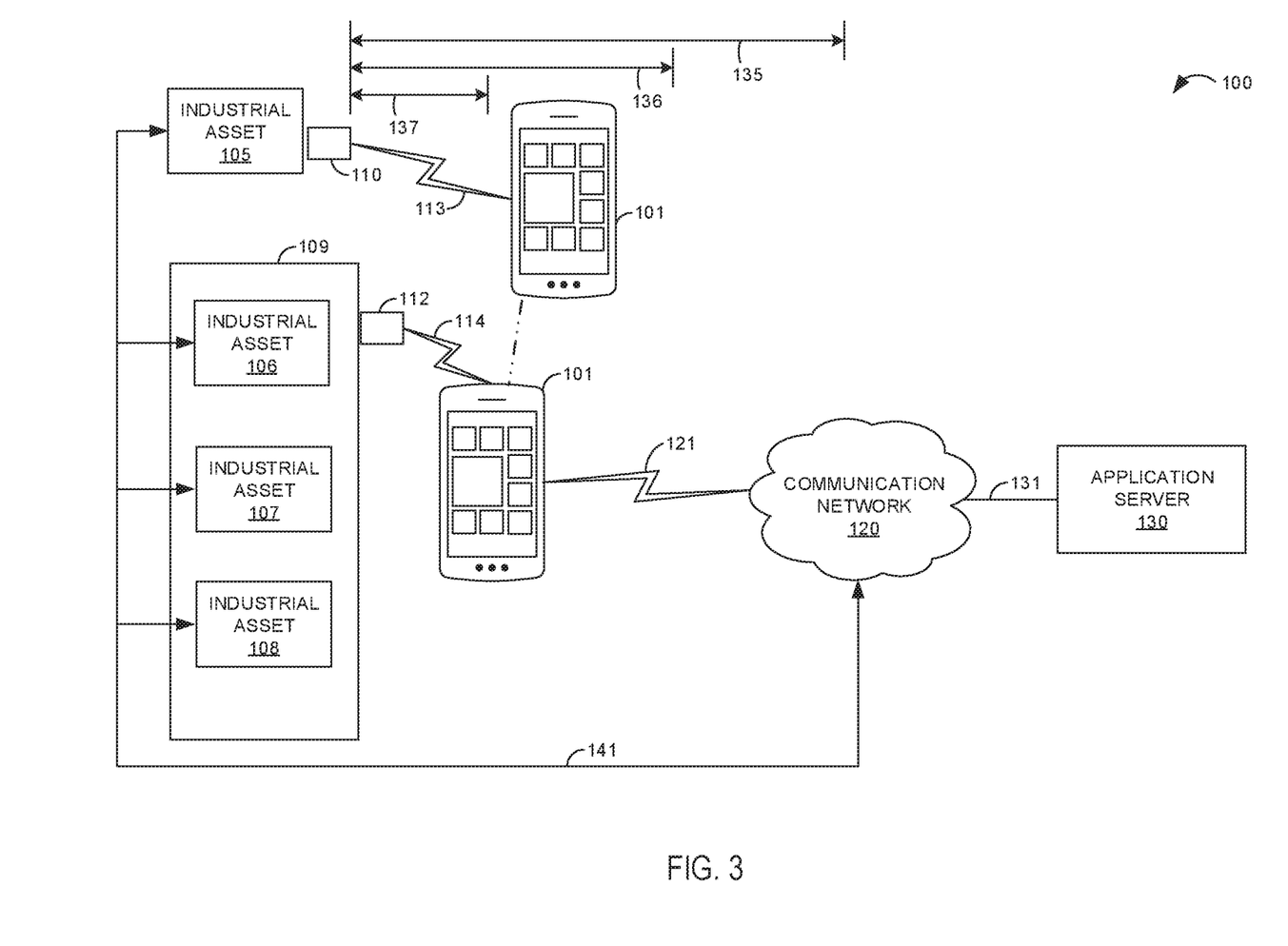
FIG. 3 is a block diagram that illustrates an operation of a communication system in an exemplary implementation.
Figure 4:
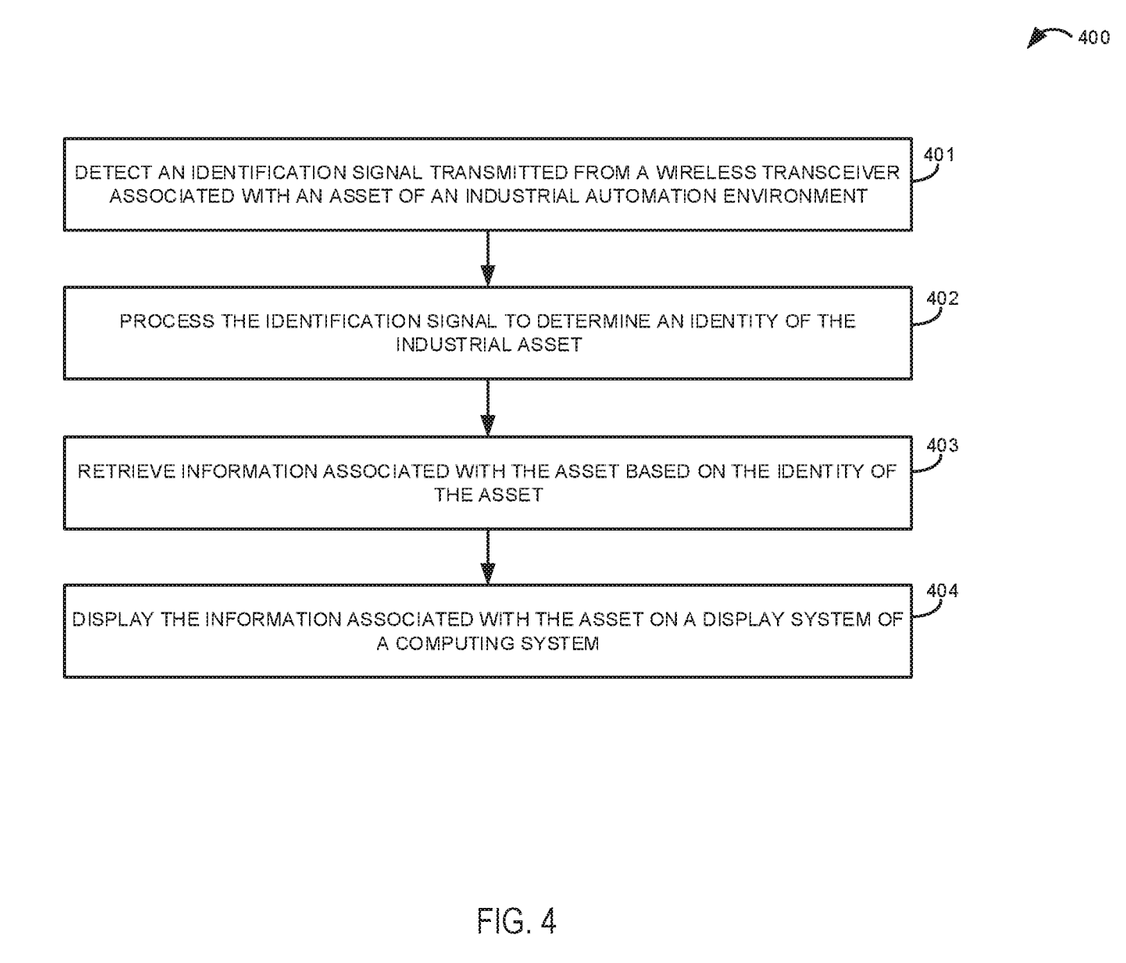
FIG. 4 is a flow diagram that illustrates an operation of a computing system in an exemplary implementation.
Figure 5:
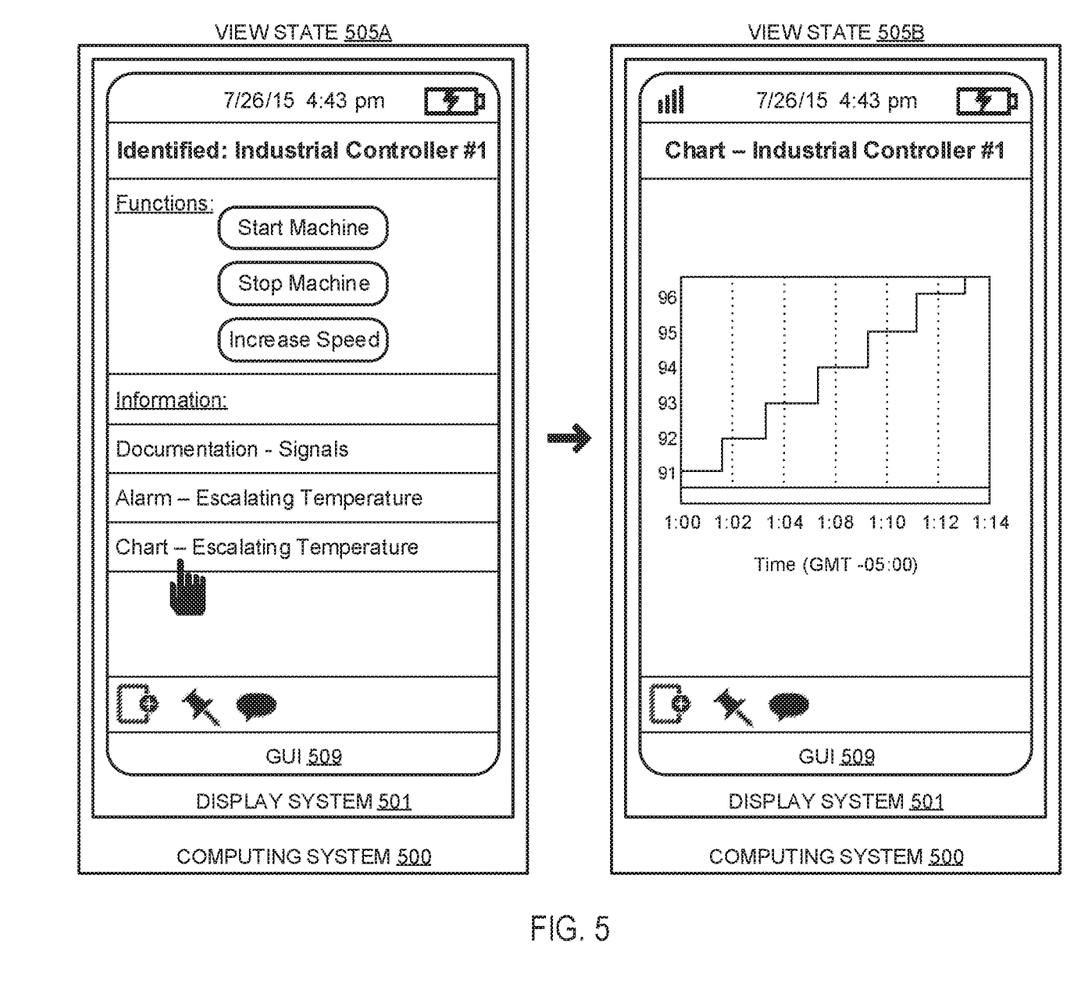
FIG. 5 is a block diagram that illustrates an operational scenario of a computing system in an exemplary implementation.
Figure 6:
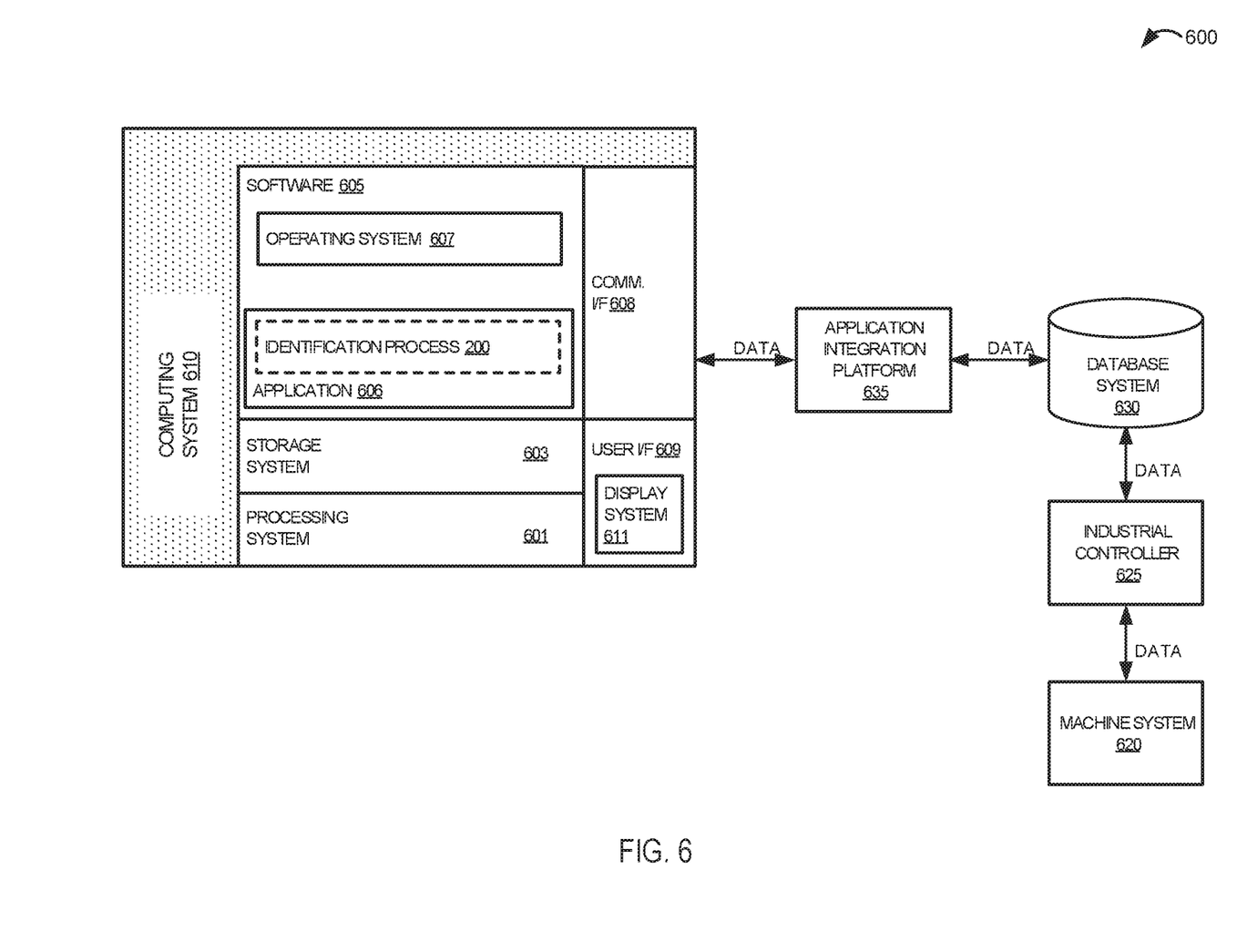
FIG. 6 is a block diagram that illustrates an operational scenario involving a computing system in an industrial automation environment in an exemplary implementation.
Figure 7:
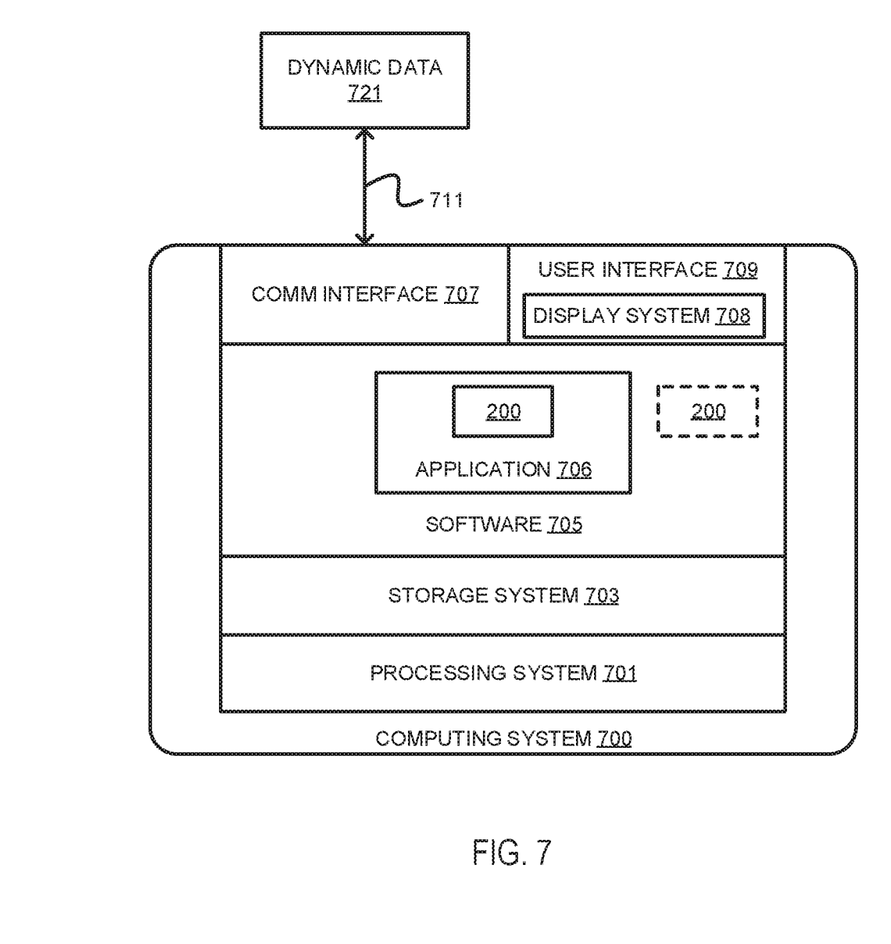
FIG. 7 is a block diagram that illustrates a computing system in an exemplary implementation.

Referring now to the drawings, FIG. 1 illustrates a communication system and an operational scenario in which a computing system detects an identification signal transmitted by an asset and retrieves information associated with the asset. FIG. 2 illustrates an identification process that may be performed by a computing system. FIG. 3 illustrates a communication system and an operational scenario in which a computing system detects an identification signal transmitted by an asset and retrieves information associated with the asset. FIG. 4 illustrates an identification process that may be performed by a computing system. FIG. 5 illustrates an operational scenario involving a computing system in an exemplary implementation that automatically displays functions and information associated with an industrial asset. FIG. 6 illustrates an exemplary industrial automation environment that includes a computing system that may be used to execute an identification process, and FIG. 7 illustrates an exemplary computing system that may be used to perform any of the identification processes and operational scenarios described herein.

Turning now to FIG. 1, an operational scenario of communication system 100 is illustrated in an exemplary implementation. Communication system 100 includes computing system 101, communication network 120, and application server 130. Computing system 101 and communication network 120 communicate over communication link 121, while communication network 120 and application server 130 are in communication over communication link 131. Industrial assets 105-108 and communication network 120 are linked over communication link 141. In some examples, communication network 120 could comprise an on-premise private network or private cloud accessible over a local network connection, a public cloud-based environment accessible over a wide area network such as the Internet, or any other deployment scheme, including combinations thereof.

An exemplary operation of communication system 100 is illustrated in FIG. 1. In this example, a user operates computing system 101 while walking through an industrial automation environment. Industrial asset 105 contains or is associated with a beacon 110 configured to continuously broadcast a wireless signal that identifies the asset 105. Similarly, industrial assets 106-108 are contained in a cabinet 109 that has a beacon 112 configured to continuously broadcast a wireless signal that identifies the assets 106-108. Beacons 110, 112 may be, for example, a radio frequency identification (RFID) tag, a Bluetooth beacon, a near-field communication (NFC) signal transmitter, or the like.

Beacons 110, 112 are smart beacons configurable with information from one or more assets from an industrial control system. FIG. 2 is a flow diagram that illustrates an operation 200 of configuring smart beacons in an exemplary implementation. The operation 200 shown in FIG. 2 may also be referred to as configuration process 200 herein. The steps of the operation are indicated below parenthetically. The following discussion of operation 200 will proceed with reference to computing system 101 of FIG. 1 in order to illustrate its operations, but note that the details provided in FIG. 1 are merely exemplary and not intended to limit the scope of process 200 to the specific implementation shown in FIG. 1.

When a user approaches industrial asset 105 or industrial assets 106-108, computing system 101 detects (201) the respective beacon 110,112 and establishes a communication 113, 114 therewith. If the beacon 110, 112 is not in a configuration mode to allow the computing system 101 to set configuration parameters of the beacon 110, 112, computing system 101 sets (202) the configuration mode of the beacon 110, 112 to allow configuration parameter manipulation.

Computing system 101 identifies (203) the asset to be associated with the beacon 110, 112. In one example, a camera of computing system is accessed and operated to scan a bar code 115-118 associated with the respective asset 105-108. In an embodiment, the bar codes 115-118 may be designed to contain the identifying information for the associated asset 105-108. For example, the bar codes 115-118 may contain asset identification (ID) information, asset operation information, asset parameter information, and the like. In another embodiment, the bar codes 115-118 may provide an identifier information to computing system 101, which may then access an internal database or an external database (e.g., via communication link 121 and communication network 120 to an external database on application server 130) to acquire the information for the industrial asset 105-108 such as the information listed above.

Some or all of the information obtained by identifying the asset (203) is used to configure the beacon 110, 112 to associate (204) the asset with the beacon. As illustrated in FIG. 1, bar code 115 may be used to identify industrial asset 105 such that beacon 110 may be programmed or configured to contain identifying information for industrial asset 105 when scanning for assets near a location of computing system 101 as described herein. Also, as illustrated in FIG. 1, bar codes 116-118 may be used to respectively identify industrial assets 106-108 such that beacon 112 may be programmed or configured to contain identifying information for industrial assets 106-108 when scanning for assets near a location of computing system 101 as described herein. Based on the asset identifying information, the signal continuously transmitted by the beacon 110, 112 in its beaconing mode contains asset information capable of identifying the one or more assets associated with the beacon 110, 112.

In addition to configuring the beacon 110, 112 to broadcast asset identification information, actions to be performed or prohibited based on a proximity of the computing system 101 to the beacon 110, 112 may be assigned (205) and configured in the beacon 110, 112. The actions may be based on rules and thresholds based at least in part on a proximity distance of the computing system 101 to the beacon 110, 112 or on a time of proximity of the computing system 101 to the beacon 110, 112. The actions allow for activities to be performed within different proximities, and functions in an application running on the computing device 101 may be activated or deactivated based on proximity. For example, an action rule may be set up such that when the computing system 101 is within a first distance threshold (e.g., 20 feet) of the beacon, the computing system 101 is operated in a monitoring mode. Accordingly, this action rule may cause a monitoring module to be automatically shown on the computing device 101 when within the first distance threshold that shows the key data values for all the devices in the cabinet containing the beacon. Another action rule may be set up such when the computing system 101 is within a second, closer distance threshold (e.g., 5 feet) of the beacon, maintenance is likely being performed. In this case, the computing device 101 may be caused to automatically show the work orders for the devices associated with the beacon 110, 112, the links to their manuals, or other maintenance information, for example. in this manner, the information displayed to the user may be reduced or expanded based on the proximity rules/actions associated with the asset. More than one action may be configured for or within a given time or distance threshold.

In another example, a command rule may be set up to prohibit command of the industrial asset 105-108 if the proximity is greater than a command proximity distance threshold (e.g., 8 feet). Accordingly, any user operating computing device 101 at a distance greater than the command proximity distance threshold will be denied control access to the asset. If the user reduces the proximity distance to a distance within the command proximity distance threshold, command of the industrial asset 105-108 may be possible. That is, even though the command proximity distance threshold may be satisfied, a user may still be denied command of the asset if the user does not have authority to command the asset. Authority may be granted based on a user profile, a computing device profile, or other permission-based parameter. If the user has the authority to command the industrial asset, asset controls may be shown on the computing device 101 when the device 101 is within the command proximity distance threshold. However, the rule may be configured to only allow commanding of the industrial asset while the computing device is maintained inside the command proximity distance. As such, if the proximity of the computing device 101 indicates that the computing device 101 is again outside the command proximity distance threshold, any command functionality allowable via computing device 101 is revoked, and the threshold must be satisfied to again gain control of the asset. Furthermore, various levels of command functionality can be granted based on further parsing proximity distances within the command proximity distance threshold.

In addition, a lockout rule may be assigned to allow only one computing device 101 to be in communication with the asset 105-108 at a time. For example, if a first communication device is within a proximity of the asset and is displaying data for the asset and/or allowing commands to be sent to the asset, the entrance of another communication device into the proximity of the asset will not allow the other device to receive information or allow control of the asset. This way, when the first communication device is granted access to the industrial asset, it will have sole communications with the asset regardless of the proximity of any other device.

Identification (203) of industrial assets, association (204) of those assets with a beacon, and assignment (205) of proximity actions may be repeated in order to associate more than one asset with one beacon. In this manner, industrial assets 106-108, located in cabinet 109, may be grouped together for identifying all assets in the cabinet 109 by scanning beacon 112 as described herein.

The wireless transceiver may also have its transmission parameters set or configured (206). In addition to transmitting information identifying associated industrial assets, the wireless transceiver may also transmit information identifying itself. As such, transmission parameters identifying the wireless transceiver (e.g., beacon 110, 112) are configurable. The transmission parameters can include a parameter enabling or disabling transmission of the advertising data to turn communication with the transceiver on or off after the configuration mode is disabled. After configuration of the wireless transceiver is complete, the configuration mode of the wireless transceiver is disabled (207) to switch the transceiver to a broadcast mode if enabled.

Still referring to FIG. 1, computing system 101 comprises a processing system and communication transceiver. Computing system 101 may also include other components such as a user interface, data storage system, and power supply. Computing system 101 may reside in a single device or may be distributed across multiple devices. Examples of computing system 101 include mobile computing devices, such as cell phones, tablet computers, laptop computers, notebook computers, and gaming devices, as well as any other type of mobile computing devices and any combination or variation thereof. Examples of computing system 101 also include desktop computers, server computers, and virtual machines, as well as any other type of computing system, variation, or combination thereof. In some implementations, computing system 101 could comprise a mobile device capable of operating in a server-like fashion which, among other uses, could be utilized in a wireless mesh network.

Communication network 120 could comprise multiple network elements such as routers, gateways, telecommunication switches, servers, processing systems, or other communication equipment and systems for providing communication and data services. In some examples, communication network 120 could comprise wireless communication nodes, telephony switches, Internet routers, network gateways, computer systems, communication links, or some other type of communication equipment, including combinations thereof. Communication network 120 may also comprise optical networks, asynchronous transfer mode (ATM) networks, packet networks, wireless mesh networks (WMN), local area networks (LAN), metropolitan area networks (MAN), wide area networks (WAN), or other network topologies, equipment, or systems—including combinations thereof. Communication network 120 may be configured to communicate over metallic, wireless, or optical links. Communication network 120 may be configured to use time-division multiplexing (TDM), Internet Protocol (IP), Ethernet, optical networking, wireless protocols, communication signaling, peer-to-peer networking over Bluetooth, Bluetooth low energy, Wi-Fi Direct, near field communication (NFC), or some other communication format, including combinations thereof. In some examples, communication network 120 includes further access nodes and associated equipment for providing communication services to several computer systems across a large geographic region.

Industrial assets 105-108 could comprise any equipment, machinery, device, resource, or the like that may be utilized in an industrial automation environment. In some examples, industrial asset 105-108 could comprise any machine or group of machines, industrial control systems comprising an industrial controller or controllers, departments or areas of a facility, a team of people responsible for an area of a facility, a work shift, physical barriers such as doors or gates, switches, materials, resources, or any other aspect of an industrial automation environment.

Application server 130 may be representative of any computing apparatus, system, or systems on which the techniques disclosed herein or variations thereof may be suitably implemented. Application server 130 comprises a processing system and communication transceiver. Application server 130 may also include other components such as a router, server, data storage system, and power supply. Application server 130 may reside in a single device or may be distributed across multiple devices. Application server 130 may be a discrete system or may be integrated within other systems, including other systems within communication system 100 or an automation control system. Some examples of application server 130 include desktop computers, server computers, cloud computing platforms, and virtual machines, as well as any other type of computing system, variation, or combination thereof. In some examples, application server 130 could comprise a programmable logic controller (PLC), programmable automation controller (PAC), network switch, router, switching system, packet gateway, authentication, authorization, and accounting (AAA) server, billing system, network gateway system, Internet access node, data server, database system, service node, firewall, or some other communication system, including combinations thereof. In some implementations, a PLC, PAC, and/or specific modules within the PLC rack could provide some or all of the functionality described herein for application server 130.

Communication links 113, 121, 131, and 141 use metal, air, space, optical fiber such as glass or plastic, or some other material as the transport medium—including combinations thereof. Communication links 113, 121, 131, and 141 could use various communication protocols, such as TDM, IP, Ethernet, telephony, optical networking, hybrid fiber coax (HFC), communication signaling, wireless protocols, or some other communication format, including combinations thereof. Communication links 113, 121, 131, and 141 could be direct links or may include intermediate networks, systems, or devices.

Turning now to FIG. 3, another operational scenario of communication system 100 is illustrated in an exemplary implementation. In this example, a user operates computing system 101 while walking through an industrial automation environment. Beacons 110, 112 continuously broadcast a wireless signal that identifies the respective associated assets 105-108. When the user approaches the beacon 110, 112, computing system 101 detects the wireless signal and determines the identity of the asset(s) associated with the beacon 110, 112. Based on the identity of the asset 105-108, computing system 101 can then retrieve information associated with the asset and display the information for viewing by the user. Additionally, in some implementations computing system 101 could transmit commands to operate various functions of industrial asset 105-108, which could occur either automatically or at the request of the user. For example, additional functionality may be enabled based on a proximity of computing system 101 to industrial asset 105-108 as described herein. An exemplary operation of computing system 101 will now be described in greater detail with respect to FIG. 4.

FIG. 4 is a flow diagram that illustrates an operation 400 of a computing system in an exemplary implementation. The operation 400 shown in FIG. 4 may also be referred to as identification process 400 herein. The steps of the operation are indicated below parenthetically. The following discussion of operation 400 will proceed with reference to computing system 101, industrial asset 105-108, and application server 130 of FIG. 3 in order to illustrate its operations, but note that the details provided in FIG. 3 are merely exemplary and not intended to limit the scope of process 400 to the specific implementation shown in FIG. 3.

Operation 400 may be employed to facilitate identification of industrial equipment using micro-location services in an industrial automation environment. As shown in the operational flow of process 400, computing system 101 detects an identification signal transmitted from a beacon 110, 112 associated with one or more assets 105-108 of the industrial automation environment (401). In some examples, industrial assets 105-108 could comprise any machine or group of machines, industrial control systems comprising an industrial controller or controllers, departments or areas of a facility, a team of people responsible for an area of a facility, a work shift, physical barriers such as doors or gates, switches, materials, resources, or any other aspect of an industrial automation environment. The beacon 110, 112 of industrial assets 105-108 transmits the identification signal that identifies asset 105-108 to enable micro-location services for asset 105-108. In some implementations, the beacon 110, 112 that transmits the identification signal could either be integrated within asset 105-108 or attached thereto, such as a Bluetooth® low energy (BLE) sticker attached to a piece of industrial equipment or machinery. The beacon 110, 112 of industrial asset 105-108 is configured to continuously transmit the identification signal for detection by computing system 101, such as a BLE beacon, an Apple iBeacon, RFID tag, NFC signal, IEEE 802.11 protocols (Wi-Fi), or any other wireless signal detectable by computing system 101, including combinations thereof.

Computing system 101 processes the identification signal to determine an identity of industrial asset 105-108 (402). Typically, the identification signal broadcast by industrial asset 105-108 includes a device identifier, serial number, or some other information that uniquely identifies industrial asset 105-108. Computing system 101 processes the identification signal to extract this identifying information to determine the identity of asset 105-108.

Computing system 101 then retrieves information associated with asset 105-108 based on the identity of the asset (403). In some implementations, computing system 101 could retrieve the information associated with asset 105-108 from application server 130 associated with the industrial automation environment, but the information associated with asset 105-108 could be stored locally within computing system 101 and thus retrieved from a local storage system of computing system 101. Examples of the information associated with asset 105-108 that could be retrieved by computing system 101 include operational data, machine data, images, screen graphics data, screen captures, video data, sound recordings, production processes, tag data, control information and logic, alarms, notifications, drive configurations, dashboards, human-machine interface (HMI) display screens, key performance indicators (KPIs), charts, trends, and other graphical content, simulation data, version numbers, catalogs, spare parts inventories, maintenance/repair schedules, links to documentation, electrical drawings, manuals, material safety data sheets, standard operating procedures, emergency procedures, cleanout procedures, reset procedures, safety procedures, incident reports including problems and solutions, chat transcripts, and any other information associated with the asset of the industrial environment. The information associated with the asset could also include a number of machine stops in a day or during a work shift, summary of overall equipment effectiveness (OEE), summary of key performance indicators, number of users who connected to the asset in a work shift or some other period, modifications to a configuration of the asset, customized reports, and any other statistics or related data associated with industrial asset 105-108.

Computing system 101 displays the information associated with asset 105-108 on a display system of computing system 101 (404). In some implementations, computing system 101 could display the information in different formats or presentations by processing the data retrieved for asset 105-108 and generating various graphical views, display screens, and other arrangements of the information. The user can then browse through the information displayed on computing system 101 to view relevant content associated with the asset 105-108. Actions performed while in communication with the asset 105-108 (e.g., viewing information and/or controlling the asset) may be controlled by proximity rules acquired from the beacon 110, 112, acquired from the application server 130, or acquired from within the computing system 101 itself. In one example, a hierarchy of which rules to follow is configurable with an application running on the computing system 101. For example, the rule hierarchy may define which rules to apply when multiple rules satisfy a given proximity condition. It may be, for example, that rules defined on the computing system 101 override rules set forth in the beacon 110, 112 or in the application server 130. In this manner, a user's preferred rules to be performed based on proximity may be the controlling rules to perform. In one example, the proximity rules obtained from the beacon or as defined by the user preferences may define rules to launch a trend display when within a first distance threshold 135 (e.g., 20 feet) of a given beacon; to create an incident when within a second threshold 136 (e.g., 5 feet) for longer than a time threshold (e.g., 2 minutes); to allow transmitting commands to asset 105-108 when within a third threshold 135 (e.g., within the command proximity distance threshold) to populate the incident with the information from the beacon; to launch a given favorite item, open an Alarms module using the IP Address in the beacon, and/or open a chat/ticket with asset information when within 20 feet as examples. Other rules are also considered within the scope of this disclosure. As such, different actions are performed depending on the level of proximity (e.g., proximity distance and/or time of proximity) of the computing system 101 to the beacon 110, 112 in an embodiment.

In at least one implementation, in addition to retrieving and displaying information, computing system 101 could transfer a command that instructs asset 105-108 to perform an action. In some examples, computing system 101 could transfer the command to the asset 105-108, a control system associated with the asset 105-108, application server 130, or any other device or system that may receive a command and instruct asset 105-108 to perform an action when the location of the computing system 101 is within the distance prescribed by the command threshold. For example, when the computing system 101 is within the command proximity distance threshold, computing system 101 allows transference of the command per the command rule. The action could include any function associated with the asset 105-108, such as starting or stopping a machine, controlling mechanical operations, managing alarms, alerts, and other notifications, manual or automatic equipment control, enabling or disabling physical push buttons or other control mechanisms of asset 105-108, activating a light switch, or any other active operations related to an industrial asset 105-108. When the proximity of the computing device 101 is outside the command proximity distance threshold, any command functionality allowable via computing device 101 is revoked.

Further, since computing system 101 will typically only be capable of detecting the identification signal associated with asset 105-108 when computing system 101 is located within a close proximity to the asset, this proximity information can be used to enable additional functionality and services related to the asset. For example, computing system 101 can notify the user when a particular asset 105-108 is within range of computing system 101. The user could also be prompted to perform a task related to the proximate asset 105-108, or notified when an alert, alarm, or some other event related to the nearby asset 105-108 is triggered. In some examples, since asset 105-108 is known to be in proximity to computing system 101 and the user, computing system 101 could offer functionality in a more passive manner, suggesting content or operations as opposed to requiring the user to actively request information and actions.

Various security measures could also be implemented for ensuring the user of computing system 101 is authorized to receive requested information or direct asset 105-108 to perform an action. In at least one implementation computing system 101 may transfer the command that instructs asset 105-108 to perform an action by transferring the command upon receiving an indication of authorization associated with a user of the computing system 101. User access to particular assets using computing system 101 could also be tracked, providing additional security logs and statistics on users performing actions on proximate assets they encounter when navigating through an industrial enterprise. A user's proximity to the asset 105-108 could also be considered along with the indication of authorization. For example, a push button that starts a machine may not be activated unless the user is authorized to activate the push button and the user's computing system 101 is in proximity to the machine. To determine user authorization, computing system 101 could prompt the user for a password or personal identification number, scan fingerprint data or other biometrics, identify the user's wireless security card, or request and receive any other user-identifying information to authorize the user. Functionality could also be controlled by the type of equipment, user/worker role, shift (on-shift or off-shift), training/certification, or any other considerations. In one exemplary scenario, the user could approach a physical barrier, such as a door or gate, and computing system 101 could detect a signal transmitted from a beacon 110, 112 attached to the barrier to identify it, verify user authorization to pass through the barrier, and responsively send a command to unlock and open the barrier. Any other actions requested by the user of computing system 101 could be similarly verified for user authorization and proximity prior to processing the command and performing the action.

Advantageously, computing system 101 wirelessly detects identification signals transmitted by various beacons 110, 112 in an industrial environment and retrieves and displays information related to the assets in proximity. The user can then review the relevant data associated with the assets encountered by the user when traveling through the industrial environment. The user may also provide control instructions for industrial machinery and equipment within the proximity rules. In this manner, the user is better able to identify and control equipment, maintain inventory, and track assets, thereby improving user productivity and enhancing management of industrial operations. An example of a user operating a computing system that detects an industrial asset and automatically provides functions and information associated with the asset presented on a graphical user interface based on the proximity of the computing system to the beaconing device that illustrates one possible implementation of the techniques disclosed herein will now be discussed with respect to FIG. 5.

FIG. 5 is a block diagram that illustrates an operational scenario of computing system 500 in an exemplary implementation. Computing system 500 includes display system 501 which displays graphical user interface (GUI) 509. In this example, display system 501 comprises a touch screen that displays GUI 509 for the user to interact with and accepts input commands from the user via the user's touches on the surface of the touch screen. In FIG. 5, two different view states are shown displayed on display system 501, labeled 505A and 505B. The different view states show the changes that occur to GUI 509 as the user makes selections and interacts with GUI 509.

In view state 505A, a user operating computing system 500 has approached an industrial controller equipped with a wireless beacon that continually broadcasts an identifier associated with the controller. Computing system 500 is configured to scan for and identify such wireless beacon transmissions and automatically retrieve functionality, information, and other content associated with the asset. In this example, computing system 500 identifies industrial controller number one and responsively displays functions and information associated with the controller that the user is authorized to access. In particular, computing system 500 displays functionality for the user to start, stop, or increase the speed of a machine controlled by industrial controller number one. Computing system 500 also retrieves and displays information associated with documentation regarding signals, an alarm warning of an escalating temperature of a machine, and a chart that displays the escalating temperature of the machine graphically. The user can then select from the various functions and information items displayed on display system 501 of computing system 500. In view state 505A, the user selects to view the chart related to the "Escalating Temperature" event, as represented by the hand icon appearing over this information item.

View state 505B illustrates an exemplary chart diagram that may appear on display system 501 in response to the user selecting the chart data item from the list of items displayed in view state 505A. The chart shows the details of the "Escalating Temperature" event associated with the "Industrial Controller #1" asset. In particular, the chart indicates that the temperature has steadily risen over time, which has triggered the "Escalating Temperature" alarm. Beneficially, the information items that are automatically displayed in response to identifying the wireless beacon transmitted by the industrial controller, which in this case allows the user to quickly view the details of the alarm event, thereby enabling the user to take the necessary action to address the problem, saving valuable time and preventing potential damage to industrial equipment while minimizing the impact on production output.

Turning now to FIG. 6, a block diagram that illustrates an industrial automation environment 600 in an exemplary implementation is shown. Industrial automation environment 600 provides an example of an industrial automation environment that may be utilized to implement the identification processes disclosed herein, but other environments could also be used. Industrial automation environment 600 includes computing system 610, machine system 620, industrial controller 625, database system 650, and application integration platform 635. Machine system 620 and controller 625 are in communication over a communication link, controller 625 and database system 650 communicate over a communication link, database system 650 and application integration platform 635 communicate over a communication link, and application integration platform 635 and computing system 610 are in communication over a communication link. Note that there would typically be many more machine systems in most industrial automation environments, but the number of machine systems shown in FIG. 6 has been restricted for clarity.

Industrial automation environment 600 comprises an automobile manufacturing factory, food processing plant, oil drilling operation, microprocessor fabrication facility, or some other type of industrial enterprise. Machine system 620 could comprise a sensor, drive, pump, filter, drill, motor, robot, fabrication machinery, mill, printer, or any other industrial automation equipment, including their associated control systems. A control system comprises, for example, industrial controller 625, which could include automation controllers, programmable logic controllers (PLCs), programmable automation controllers (PACs), or any other controllers used in automation control. Additionally, machine system 620 could comprise other industrial equipment, such as a brew kettle in a brewery, a reserve of coal or other resources, or any other element that may reside in an industrial automation environment 600.

Machine system 620 continually produces operational data over time. The operational data indicates the current status of machine system 620, such as parameters, pressure, temperature, speed, energy usage, operational equipment effectiveness (OEE), mean time between failure (MTBF), mean time to repair (MTTR), voltage, throughput volumes, times, tank levels, or any other performance status metrics. The operational data may comprise dynamic charts or trends, real-time video, or some other graphical content. Machine system 620 and/or controller 625 is capable of transferring the operational data over a communication link to database system 650, application integration platform 635, and computing system 610, typically via a communication network. Database system 650 could comprise a disk, tape, integrated circuit, server, or some other memory device. Database system 650 may reside in a single device or may be distributed among multiple memory devices.

Application integration platform 635 comprises a processing system and a communication transceiver. Application integration platform 635 may also include other components such as a router, server, data storage system, and power supply. Application integration platform 635 provides an example of application server 130, although server 130 could use alternative configurations. Application integration platform 635 may reside in a single device or may be distributed across multiple devices. Application integration platform 635 may be a discrete system or may be integrated within other systems—including other systems within industrial automation environment 600. In some examples, application integration platform 635 could comprise a FactoryTalk® VantagePoint server system provided by Rockwell Automation, Inc.

The communication links over which data is exchanged between machine system 620, industrial controller 625, database system 650, application integration platform 635, and communication interface 608 of computing system 610 could use metal, air, space, optical fiber such as glass or plastic, or some other material as the transport medium—including combinations thereof. The communication links could comprise multiple network elements such as routers, gateways, telecommunication switches, servers, processing systems, or other communication equipment and systems for providing communication and data services. These communication links could use various communication protocols, such as TDM, IP, Ethernet, telephony, optical networking, packet networks, wireless mesh networks (WMN), local area networks (LAN), metropolitan area networks (MAN), wide area networks (WAN), hybrid fiber coax (HFC), communication signaling, wireless protocols, communication signaling, peer-to-peer networking over Bluetooth, Bluetooth low energy, Wi-Fi Direct, near field communication (NFC), or some other communication format, including combinations thereof. The communication links could be direct links or may include intermediate networks, systems, or devices.

Computing system 610 may be representative of any computing apparatus, system, or systems on which the identification processes disclosed herein or variations thereof may be suitably implemented. Computing system 610 provides an example of a computing system that could be used as a either a server or a client device in some implementations, although such devices could have alternative configurations. Examples of computing system 610 include mobile computing devices, such as cell phones, tablet computers, laptop computers, notebook computers, and gaming devices, as well as any other type of mobile computing devices and any combination or variation thereof. Examples of computing system 610 also include desktop computers, server computers, and virtual machines, as well as any other type of computing system, variation, or combination thereof. In some implementations, computing system 610 could comprise a mobile device capable of operating in a server-like fashion which, among other uses, could be utilized in a wireless mesh network.

Computing system 610 includes processing system 601, storage system 603, software 605, communication interface 608, and user interface 609. Processing system 601 is operatively coupled with storage system 603, communication interface 608, and user interface 609. Processing system 601 loads and executes software 605 from storage system 603. Software 605 includes application 606 and operating system 607. Application 606 may include processes 200, 400 in some examples. When executed by computing system 610 in general, and processing system 601 in particular, software 605 directs computing system 610 to operate as described herein for processes 200, 400 or variations thereof. In this example, user interface 609 includes display system 611, which itself may be part of a touch screen that also accepts user inputs via touches on its surface. Computing system 610 may optionally include additional devices, features, or functionality not discussed here for purposes of brevity.

Turning now to FIG. 7, a block diagram is shown that illustrates computing system 700 in an exemplary implementation. Computing system 700 provides an example of computing systems 101 and 500, or any computing system that may be used to execute processes 200, 400 or variations thereof, although such systems could use alternative configurations. Computing system 700 includes processing system 701, storage system 703, software 705, communication interface 707, and user interface 709. User interface 709 comprises display system 708. Software 705 includes application 706 which itself includes processes 200, 400. Processes 200, 400 may optionally be implemented separately from application 706.

Computing system 700 may be representative of any computing apparatus, system, or systems on which application 706 and processes 200, 400 or variations thereof may be suitably implemented. Examples of computing system 700 include mobile computing devices, such as cell phones, tablet computers, laptop computers, notebook computers, and gaming devices, as well as any other type of mobile computing devices and any combination or variation thereof. Note that the features and functionality of computing system 700 may apply as well to desktop computers, server computers, and virtual machines, as well as any other type of computing system, variation, or combination thereof.

Computing system 700 includes processing system 701, storage system 703, software 705, communication interface 707, and user interface 709. Processing system 701 is operatively coupled with storage system 703, communication interface 707, and user interface 709. Processing system 701 loads and executes software 705 from storage system 703. When executed by computing system 700 in general, and processing system 701 in particular, software 705 directs computing system 700 to operate as described herein for processes 200, 400 or variations thereof. Computing system 700 may optionally include additional devices, features, or functionality not discussed herein for purposes of brevity.

Referring still to FIG. 7, processing system 701 may comprise a microprocessor and other circuitry that retrieves and executes software 705 from storage system 703. Processing system 701 may be implemented within a single processing device but may also be distributed across multiple processing devices or sub-systems that cooperate in executing program instructions. Examples of processing system 701 include general purpose central processing units, application specific processors, and logic devices, as well as any other type of processing device, combinations, or variations thereof.

Storage system 703 may comprise any computer readable media or storage media readable by processing system 701 and capable of storing software 705. Storage system 703 may include volatile and nonvolatile, removable and non-removable media implemented in any method or technology for storage of information, such as computer readable instructions, data structures, program modules, or other data. Storage system 703 may be implemented as a single storage device but may also be implemented across multiple storage devices or sub-systems co-located or distributed relative to each other. Storage system 703 may comprise additional elements, such as a controller, capable of communicating with processing system 701. Examples of storage media include random access memory, read only memory, magnetic disks, optical disks, flash memory, virtual memory and non-virtual memory, magnetic cassettes, magnetic tape, magnetic disk storage or other magnetic storage devices, or any other medium which can be used to store the desired information and that may be accessed by an instruction execution system, as well as any combination or variation thereof, or any other type of storage media. In some examples, a computer-readable storage medium may include a non-transitory medium. The term "non-transitory" indicates that the storage medium is not embodied in a carrier wave or a propagated signal.

In operation, in conjunction with user interface 709, processing system 701 loads and executes portions of software 705, such as processes 200, 400, to render a graphical user interface for application 706 for display by display system 708 of user interface 709. Software 705 may be implemented in program instructions and among other functions may, when executed by computing system 700 in general or processing system 701 in particular, direct computing system 700 or processing system 701 to detect an identification signal transmitted from a wireless transceiver (beacon 110, 112) associated with an asset of an industrial automation environment. In addition, software 705 directs computing system 700 or processing system 701 to process the identification signal to determine an identity of the asset, and retrieve information associated with the asset based on the identity of the asset. Finally, software 705 may direct computing system 700 or processing system 701 to display the information associated with the asset on display system 708 of computing system 700.

Software 705 may include additional processes, programs, or components, such as operating system software or other application software. Examples of operating systems include Windows®, iOS®, and Android®, as well as any other suitable operating system. Software 705 may also comprise firmware or some other form of machine-readable processing instructions executable by processing system 701.

In general, software 705 may, when loaded into processing system 701 and executed, transform computing system 700 overall from a general-purpose computing system into a special-purpose computing system customized to facilitate identification of industrial equipment using micro-location services in an industrial automation environment as described herein for each implementation. For example, encoding software 705 on storage system 703 may transform the physical structure of storage system 703. The specific transformation of the physical structure may depend on various factors in different implementations of this description. Examples of such factors may include, but are not limited to the technology used to implement the storage media of storage system 703 and whether the computer-readable storage media are characterized as primary or secondary storage.

In some examples, if the computer-readable storage media are implemented as semiconductor-based memory, software 705 may transform the physical state of the semiconductor memory when the program is encoded therein. For example, software 705 may transform the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate this discussion.

It should be understood that computing system 700 is generally intended to represent a computing system with which software 705 is deployed and executed in order to implement application 706 and/or processes 200, 400 (and variations thereof). However, computing system 700 may also represent any computing system on which software 705 may be staged and from where software 705 may be distributed, transported, downloaded, or otherwise provided to yet another computing system for deployment and execution, or yet additional distribution. For example, computing system 700 could be configured to deploy software 705 over the internet to one or more client computing systems for execution thereon, such as in a cloud-based deployment scenario.

Communication interface 707 may include communication connections and devices that allow for communication between computing system 700 and other computing systems (not shown) or services, over a communication network 711 or collection of networks. In some implementations, communication interface 707 receives dynamic data 721 over communication network 711. Examples of connections and devices that together allow for inter-system communication may include network interface cards, antennas, power amplifiers, RF circuitry, transceivers, and other communication circuitry. The aforementioned network, connections, and devices are well known and need not be discussed at length here.

User interface 709 may include a voice input device, a touch input device for receiving a gesture from a user, a motion input device for detecting non-touch gestures and other motions by a user, and other comparable input devices and associated processing elements capable of receiving user input from a user. Output devices such as display system 708, speakers, haptic devices, and other types of output devices may also be included in user interface 709. The aforementioned user input devices are well known in the art and need not be discussed at length here. User interface 709 may also include associated user interface software executable by processing system 701 in support of the various user input and output devices discussed above. Separately or in conjunction with each other and other hardware and software elements, the user interface software and devices may provide a graphical user interface, a natural user interface, or any other kind of user interface.

The functional block diagrams, operational sequences, and flow diagrams provided in the figures are representative of exemplary architectures, environments, and methodologies for performing novel aspects of the disclosure. While, for purposes of simplicity of explanation, methods included herein may be in the form of a functional diagram, operational sequence, or flow diagram, and may be described as a series of acts, it is to be understood and appreciated that the methods are not limited by the order of acts, as some acts may, in accordance therewith, occur in a different order and/or concurrently with other acts from that shown and described herein. For example, those skilled in the art will understand and appreciate that a method could alternatively be represented as a series of interrelated states or events, such as in a state diagram. Moreover, not all acts illustrated in a methodology may be required for a novel implementation.

The above description and associated drawings teach the best mode of the invention. The following claims specify the scope of the invention. Some aspects of the best mode may not fall within the scope of the invention as specified by the claims. Also, while the preceding discussion describes embodiments employed specifically in conjunction with the monitoring and analysis of industrial processes, other applications, such as the mathematical modeling or monitoring of any man-made or naturally-existing system, may benefit from use of the concepts discussed above. Further, those skilled in the art will appreciate that the features described above can be combined in various ways to form multiple variations of the invention. As a result, the invention is not limited to the specific embodiments described above, but only by the following claims and their equivalents.

What is claimed is:

1. A computing apparatus comprising:
   one or more computer-readable storage media;
   one or more processors operatively coupled with the one or more computer-readable storage media; and
   program instructions stored on the one or more computer-readable storage media that, when read and executed by the one or more processors, direct the computing apparatus to at least:
   detect a wireless beacon signal associated with an asset in an industrial automation environment;
   classify a proximity of the computing apparatus with respect to the asset as having met a proximity threshold of a set of proximity thresholds; and
   selectively display a subset of content associated with the asset based at least on the proximity threshold met by the computing apparatus with respect to the asset.

2. The computing apparatus of claim 1, to selectively display the content associated with the asset based on the proximity threshold met by the computing apparatus, the program instructions direct the computing apparatus to identify the subset of the content associated with the asset that corresponds to the proximity threshold met by the computing apparatus with respect to the asset.

3. The computing apparatus of claim 2 wherein the proximity threshold comprises a distance to the asset and the set of proximity thresholds comprises a set of distances distinct from each other.

4. The computing apparatus of claim 3 wherein, to classify the proximity of the computing apparatus as having met the proximity threshold, the program instructions direct the computing apparatus to determine the distance to the asset and determine within which of the set of distances the distance to the asset falls.

5. The computing apparatus of claim 2 wherein the proximity threshold comprises a travel time to the asset and the set of proximity thresholds comprises a set of travel times distinct from each other.

6. The computing apparatus of claim 5 wherein, to classify the proximity of the computing apparatus as having met the proximity threshold, the program instructions direct the computing apparatus to determine the travel time to the asset and determine within which of the set of travel times the travel time to the asset falls.

7. The computing apparatus of claim 1 wherein the content comprises information indicative of an operational state of the asset and wherein the subset of the content comprises only a subset of the information.

8. The computing apparatus of claim 1 wherein the content comprises functions associated with the asset and wherein the subset of the content comprises only a subset of the functions.

9. A method of operating in an industrial automation environment, the method comprising:
   transmitting a wireless signal from a beacon associated with an asset in the industrial automation environment;
   receiving the wireless signal in user device in the industrial automation environment;
   in an application server in the industrial automation environment:
   determining a proximity of the user device to the asset;
   identifying a subset of content associated with the asset corresponding to a proximity threshold satisfied by the proximity of the user device to the asset; and
   sending the subset of the content to the user device; and
   displaying the subset of the content on the user device.

10. The method of claim 9 wherein identifying the subset of the content that corresponds to the proximity threshold comprises:
    classifying the proximity of the user device with respect to the asset as having met a one of multiple proximity thresholds corresponding to subsets of the content; and
    identifying the subset of the content corresponding the one of the multiple proximity thresholds met by the proximity of the user device to the asset.

11. The method of claim 10 wherein the proximity threshold comprises a distance to the asset and the multiple proximity thresholds comprises multiple distances.

12. The method of claim 10 wherein the proximity threshold comprises a travel time to the asset and the multiple proximity thresholds comprises multiple travel times.

13. The method of claim 10 wherein the content comprises information indicative of an operational state of the asset and wherein the subset of the content comprises only a subset of the information.

14. The method of claim 10 wherein the content comprises functions associated with the asset wherein the subset of the content comprises only a subset of the functions.

15. The method of claim 10 wherein the content comprises information indicative of an operational state of the asset and functions associated with the asset and wherein the subset of the content comprises only a subset of the information and a subset of the functions.

16. One or more computer-readable storage media having program instructions stored thereon that, when executed by one or more processors, direct a computing apparatus to at least:
    detect a wireless beacon signal associated with an asset in an industrial automation environment;
    classify a proximity of the computing apparatus with respect to the asset as having met a proximity threshold of a set of proximity thresholds; and selectively display a subset of content associated with the asset based at least on the proximity threshold met by the computing apparatus with respect to the asset.

17. The one or more computer-readable storage media of claim 16, to selectively display the content associated with the asset based on the proximity threshold met by the computing apparatus, the program instructions direct the computing apparatus to identify the subset of the content associated with the asset that corresponds to the proximity threshold met by the computing apparatus with respect to the asset.

18. The one or more computer-readable storage media of claim 16 wherein the content comprises information indicative of an operational state of the asset and wherein the subset of the content comprises only a subset of the information.

19. The one or more computer-readable storage media of claim 16 wherein the content comprises functions associated with the asset and wherein the subset of the content comprises only a subset of the functions.

20. The one or more computer-readable storage media of claim 16 wherein:
- the content comprises information indicative of an operational state of the asset and functions associated with the asset; and
- the subset of the content comprises only a subset of the information and a subset of the functions.

* * * * *